(12) United States Patent  (10) Patent No.: US 7,549,672 B2
Sato et al.  (45) Date of Patent: Jun. 23, 2009

(54) SIDE AIRBAG DEVICE

(75) Inventors: Yuji Sato, Aichi-ken (JP); Toshinori Tanase, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 144 days.

(21) Appl. No.: 11/135,405

(22) Filed: May 24, 2005

(65) Prior Publication Data

US 2006/0131847 A1  Jun. 22, 2006

(30) Foreign Application Priority Data

May 27, 2004 (JP) ............................. 2004-158101
Sep. 15, 2004 (JP) ............................. 2004-268731
Mar. 28, 2005 (JP) ............................. 2005-092898

(51) Int. Cl.
*B60R 21/20* (2006.01)
(52) U.S. Cl. ................. 280/730.2; 280/729; 280/743.1; 280/743.2
(58) Field of Classification Search .............. 280/730.1, 280/730.2, 743.2, 743.1, 729
See application file for complete search history.

(56) References Cited

U.S. PATENT DOCUMENTS

| 5,364,124 | A | * | 11/1994 | Donegan et al. | ......... | 280/730.1 |
| 5,609,363 | A | * | 3/1997 | Finelli | ..................... | 280/743.2 |
| 5,636,862 | A | * | 6/1997 | Cheung et al. | ........... | 280/730.2 |
| 5,730,464 | A | * | 3/1998 | Hill | ......................... | 280/743.2 |
| 5,911,434 | A | * | 6/1999 | Townsend | ............... | 280/730.2 |
| 5,913,536 | A | * | 6/1999 | Brown | ..................... | 280/730.2 |
| 6,116,644 | A | * | 9/2000 | Viano et al. | ............... | 280/743.1 |
| 6,142,507 | A | | 11/2000 | Okuda et al. | | |
| 6,695,342 | B2 | * | 2/2004 | Tanase et al. | ............ | 280/730.2 |
| 7,182,365 | B2 | * | 2/2007 | Takimoto et al. | ......... | 280/730.1 |
| 2003/0168836 | A1 | | 9/2003 | Sato et al. | | |
| 2005/0173900 | A1 | * | 8/2005 | Zhao et al. | ................ | 280/730.2 |
| 2005/0236819 | A1 | * | 10/2005 | Riedel et al. | ............. | 280/730.2 |
| 2006/0119083 | A1 | * | 6/2006 | Peng et al. | ................ | 280/730.2 |
| 2007/0170707 | A1 | | 7/2007 | Sato et al. | | |

FOREIGN PATENT DOCUMENTS

| DE | 4019596 | * | 1/1992 |
| JP | A-H07-329688 | | 12/1995 |
| JP | A-10-175497 | | 6/1998 |
| JP | A-10-181498 | | 7/1998 |
| JP | A-H10-297409 | | 11/1998 |
| JP | A-2000-280853 | | 10/2000 |
| JP | A-2000-289556 | | 10/2000 |
| JP | A-2001-114060 | | 4/2001 |
| JP | A-2003-335208 | | 11/2003 |
| JP | A-2004-058860 | | 2/2004 |
| JP | A-H07-329688 | | 12/2005 |

OTHER PUBLICATIONS

Office Action dated Jan. 16, 2009 in corresponding Japanese patent application No. 2004-268731.

* cited by examiner

*Primary Examiner*—Eric Culbreth
(74) *Attorney, Agent, or Firm*—Posz Law Group, PLC

(57) ABSTRACT

A side airbag device having an airbag and an inflator. The airbag has an airbag body which is unfolded and inflated, by gas supplied from an inflator, between the body side of a vehicle and an occupant's chest to head region. A projecting portion is unfolded and inflated from the airbag body in front of the occupant's head.

5 Claims, 12 Drawing Sheets

SIDE AIRBAG DEVICE

BACKGROUND OF THE INVENTION

The present invention relates to a side airbag device that unfolds and inflates an airbag from beside or near a vehicle occupant when an impact greater than a predetermined value is applied to the side of the vehicle body due to a collision at a side of the vehicle.

A typical side airbag device functions to absorb the impact applied to an occupant by unfolding and inflating an airbag when an impact greater than a predetermined value is applied to the side of the vehicle body. This protects the occupant's head and chest.

Japanese Laid-Open Patent Publication No. 2001-114060 describes a side airbag device with an airbag that is unfolded and inflated from beside an occupant's chest and head upon a collision. Japanese Laid-Open Patent Publication No. 7-329688 describes a side airbag device with an airbag that is unfolded and inflated from beside an occupant's head, chest, and abdomen and in front of the occupant's abdomen.

With the side airbag device of Japanese Patent Laid-Open Publication No. 2001-114060, the airbag is unfolded and inflated only from beside an occupant's head. With the side airbag device described in Japanese Patent Laid-Open Publication No. 7-329688, the airbag is unfolded and inflated only from beside the occupant and in front of the occupant's abdomen. However, there are recent demands for a side airbag device with improved protection performance that protects the occupant's head when impact is applied toarrant the vehicle from a diagonally frontward direction.

SUMMARY OF THE INVENTION

It is an object of the present invention to provide a side airbag device with improved protection performance that protects the occupant's head when an impact is applied to the vehicle from a diagonally frontward direction.

One aspect of the present invention is a side airbag device for providing protection in a space between a vehicle occupant and a body side of a vehicle when the occupant is seated on a vehicle seat in a passenger compartment. The side airbag device includes a gas generator and an airbag for unfolding and inflating by gas supplied from the gas generator between the body side of the vehicle and the occupant seated on the seat. The airbag includes an airbag body for unfolding and inflating beside the occupant in the space between the occupant and the vehicle body side. A projecting portion unfolds and inflates from the airbag body in front of the occupant's head.

A further aspect of the present invention is a side airbag device for providing protection in a space between a vehicle occupant and a body side of a vehicle when the occupant is seated on a vehicle seat. The side airbag device includes a gas generator and an airbag for unfolding and inflating by pressure of gas injected from the gas generator between the body side of the vehicle and the occupant seated on the seat with an urging force directed toward the front of the vehicle. The airbag includes a main unfolding portion for unfolding and inflating beside the occupant's chest. A secondary unfolding portion, formed integrally with and in communication with the main unfolding portion, unfolds and inflates at a location that is one of beside the occupant's head and beside the occupant's hip. A pocket is arranged in the secondary unfolding portion having an opening that opens towards the gas generator ranged in the main unfolding portion. A fragile portion, formed in the pocket, tears open when the secondary unfolding portion is unfolded and inflated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described in detail with reference to FIGS. 1 to 3.

Figure 1:
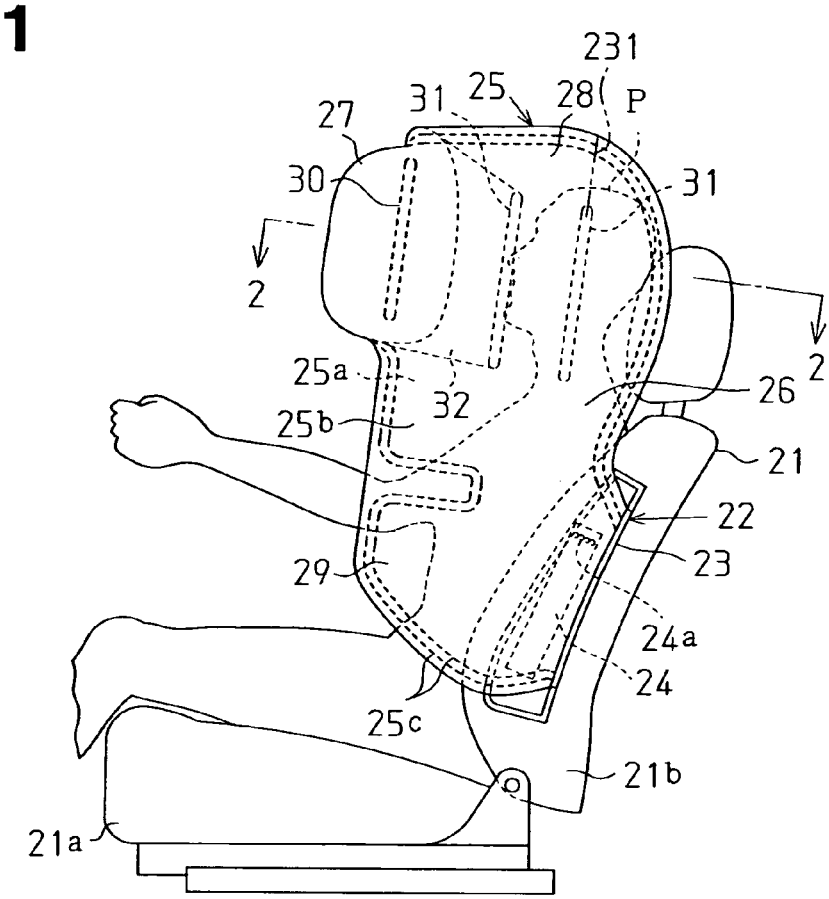
FIG. 1 is a side view showing a state in which an airbag according to a first embodiment is unfolded and inflated.

FIG. 1 illustrates a left front seat 21 arranged inside a passenger compartment. The front seat 21 includes a seating portion 21a and a backrest 21b. A side airbag device 22, which is accommodated in a casing 23, is embedded in the backrest 21b in the side facing the exterior of the vehicle. The side airbag device 22 is arranged in correspondence with a door (not shown) forming part of the vehicle body side. Although only the left front seat 21 is illustrated in the drawing, a right front seat may have a similar side airbag device 22 embedded in its backrest.

The side airbag device 22 has an inflator 24, serving as a gas generator, fixed in the interior of the casing 23, and an airbag 25 covering the inflator 24. The inflator 24 contains a gas generation agent for unfolding and inflating the airbag 25. A gas injection port 24a is formed in the top of the inflator 24 for injecting the gas generated by the gas generation agent. The inflator 24 is electrically connected to an impact sensor (not shown) for sensing the impact applied to the vehicle body side. Accordingly, when an impact greater than a predetermined value is applied to the vehicle body side, gas is generated by the gas generation agent in response to a detection signal from the sensor. Then, the gas is injected from the inflator 24 and supplied into the airbag 25 through the gas injection port 24a to unfold and inflate the airbag 25.

Figure 2:
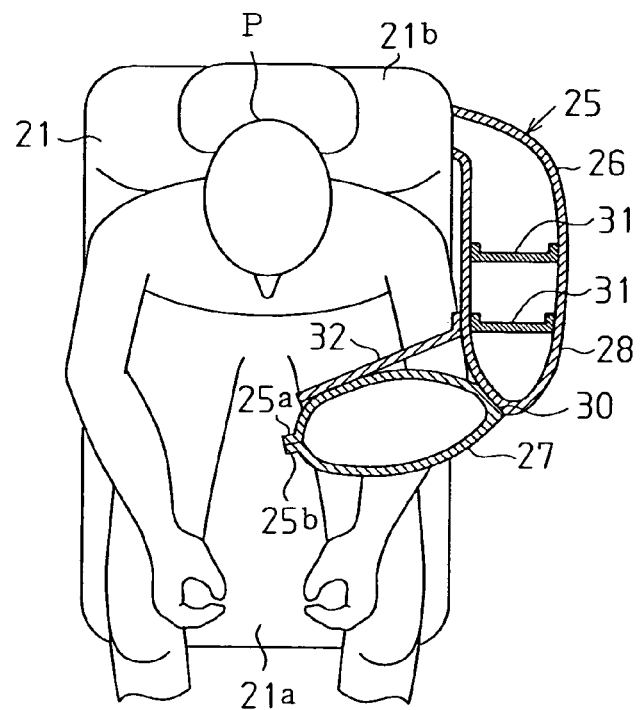
FIG. 2 is a schematic cross-sectional plan view taken along line 2-2 of FIG. 1.
Figure 3:
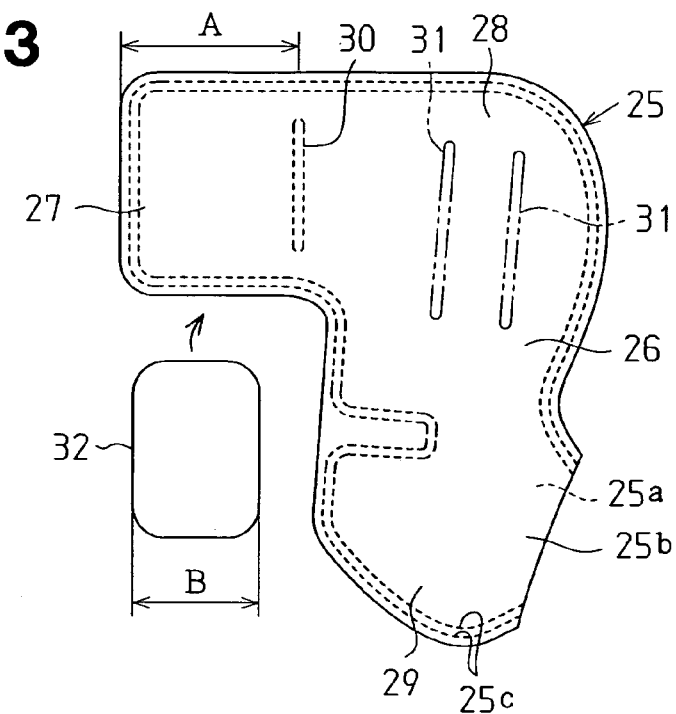
FIG. 3 is a side view showing a state in which the airbag is unfolded.

As shown in FIGS. 1 to 3, the airbag 25 is formed into the shape of a bag by sewing together the peripheries of a pair of base cloths 25a and 25b, which are made of woven cloths. The airbag 25 is normally accommodated in the casing 23 in a folded state. The outer surface of the base cloths 25a and 25b, or the outer surface of the airbag 25, is coated with a silicon resin to restrict slippage of the airbag 25 when the airbag 25 comes into contact with an occupant P. A peripheral seam 25c, which is formed by sewing together the pair of base cloths 25a and 25b with thread, is formed along the periphery of the airbag 25 so as to extend along the peripheries of the base cloths 25a and 25b.

FIGS. 1 and 2 illustrate the airbag 25 in a state filled with gas to be unfolded and inflated to its maximum. FIG. 3 is an exploded view showing the airbag 25 before it is accommodated in the front seat 21 in which the base cloths are unfolded and not filled with gas. Although the airbag 25 and a planar tether 32 are illustrated separately in FIG. 3 to facilitate understanding, the planar tether 32 is actually sewn to the airbag 25 as shown in FIG. 2.

The airbag 25 includes an airbag body 26 and a projecting portion 27. The airbag body 26 is unfolded and inflated beside or near the occupant P, or in the space between the vehicle body side and the head to chest region of the occupant P. The projecting portion 27 projects from the front end of the airbag body 26 to be unfolded and inflated in front of the head of the occupant P.

The airbag body 26 includes an upper inflation portion 28 for protecting the head to neck region of the occupant P and a lower inflation portion 29 for protecting the neck to chest region of the occupant P. A pair of belt-shaped tethers 31 are sewn to a central part of the upper inflation portion 28 so as to bridge the inner surfaces of two base cloths 25a and 25b. The pair of belt-shaped tethers 31 extend laterally and substantially parallel to the backrest 21b. Further, the belt-shaped tethers 31 are parallel to each other and spaced from each other by a predetermined distance. The belt-shaped tethers 31 have the same width along their entire lengths.

The projecting portion 27 is formed integrally with the front end of the upper inflation portion 28. A partition seam 30, extending vertically, is formed between the upper inflation portion 28 and the projecting portion 27 by sewing and joining the base cloths 25a and 25b together. Thus, the upper inflation portion 28 is partitioned from the projecting portion 27 by the partition seam 30. The interior of the upper inflation portion 28 and the interior of the projecting portion 27 communicate with each other at the upper and lower ends of the partition seam 30.

The projecting portion 27 is formed integrally with the upper inflation portion 28, or with the airbag body 26. As shown in FIG. 3, the base cloths 25a and 25b forming the airbag 25 are each prepared by cutting a woven cloth into a shape defined by combining the airbag body 26 and projecting portion 27 (into a reversed L-shape in the present embodiment). The peripheral seam 25c is formed along a continuous line connecting the seam formed in the airbag body 26 with the seam formed in the projecting portion 27. Since the airbag body 26 and the projecting portion 27 are formed integrally in this manner, there are no complicated procedures, such as separately forming and then connecting the airbag body 26 and the projecting portion 27. Thus, the manufacture of the airbag 25 is simplified. Additionally, the integral formation of the airbag body 26 and the projecting portion 27 increases the strength between the airbag body 26 and the projecting portion 27 when the airbag 25 is unfolded and inflated to its maximum. This also increases the durability of the boundary between the airbag body 26 and the projecting portion 27.

Referring to FIGS. 2 and 3, the planar tether 32 having a substantially rectangular shape is sewn to the airbag 25 in order to connect the outer distal end surface of the projecting portion 27 with the vehicle interior side of the outer surface of the upper inflation portion 28. The distance A from the partition seam 30 to the distal end of the projecting portion 27 is greater than the width B of the planar tether 32. This means that, when the airbag 25 is unfolded and inflated, the planar tether 32 pulls the distal end of the projecting portion 27 towards the rear of the vehicle. In this state, the partition seam 30 functions as a hinge to hold the projecting portion 27 in a state bent at a substantially right angle relative to the airbag body 26.

Operation of the side airbag device 22 will now be described. When an impact is applied to the vehicle body side from a diagonally frontward direction, the airbag body 26 is unfolded and inflated beside the occupant P, while the projecting portion 27 is unfolded and inflated in front of the head of the occupant P. In other words, the airbag 25 is unfolded and inflated in a space diagonally in front of the occupant P within the passenger compartment. Therefore, the airbag 25 has improved performance in protecting the head of the occupant P from a front pillar or an object that may enter the passenger compartment during a collision. The planar tether 32 is extended under tension when the airbag body 26 and the projecting portion 27 are unfolded and inflated. The planar tether 32 thus ensures a wide contact surface between the airbag 25 and the occupant P. This effectively absorbs the impact applied to the planar tether 32.

The first embodiment has the advantages described below.

(1) The airbag 25 unfolds and inflates the airbag body 26 and the projecting portion 27 diagonally frontward from the occupant P. Specifically, the projecting portion 27 is unfolded and inflated to project from the airbag body 26 in front of the head of the occupant P when an impact is applied to the vehicle from a diagonally frontward direction. Therefore, it is possible to improve the performance in protecting the occupant's head (especially face) from an object that may enter the passenger compartment during a collision.

(2) When the airbag 25 is unfolded and inflated due to an impact applied to the vehicle from a diagonally frontward direction, the projecting portion 27 is held by the planar tether 32 projecting in front of the head of the occupant P so as to form a predetermined three-dimensional shape. This further improves the performance of the airbag in protecting the head of the occupant P. The planar tether 32 is under tension when the airbag 25 is unfolded and inflated. This absorbs impacts when the airbag 25 comes into contact with the occupant P.

A second embodiment of the present invention will now be described in detail with reference to FIGS. 4 to 7C. In the description of the second embodiment, elements similar to those of the first embodiment are denoted with reference numerals obtained by adding '100' to the respective corresponding reference numerals of the first embodiment. Such elements will not be described in detail.

Figure 4:
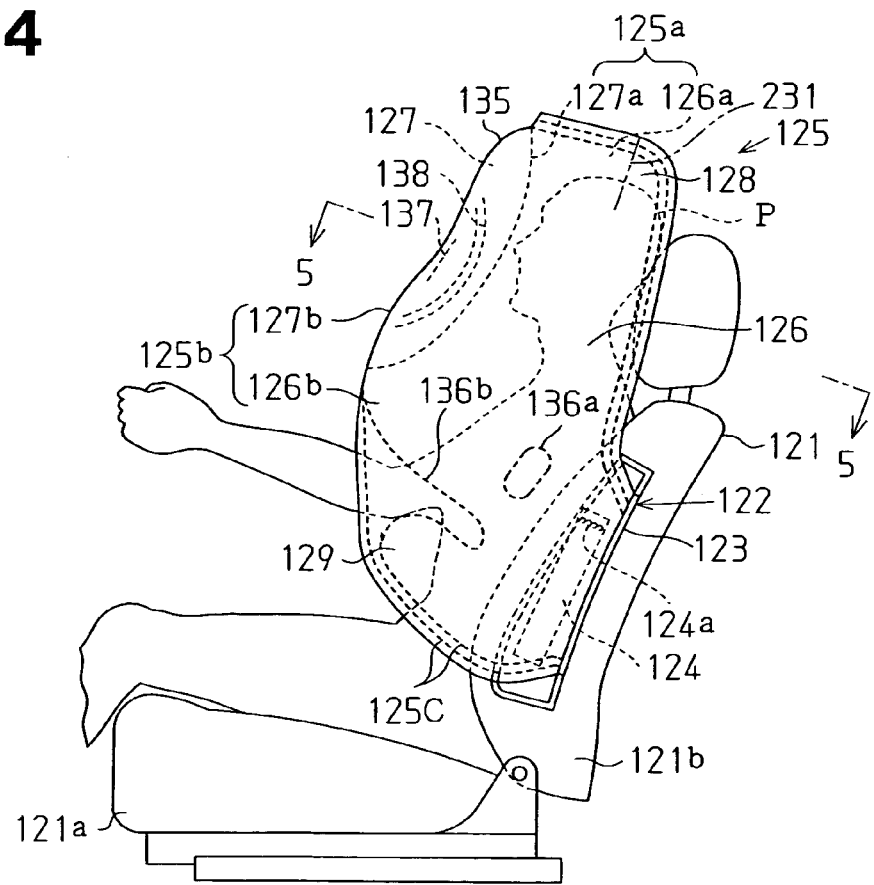
FIG. 4 is a side view showing a state in which an airbag according to a second embodiment is unfolded and inflated.
Figure 5:
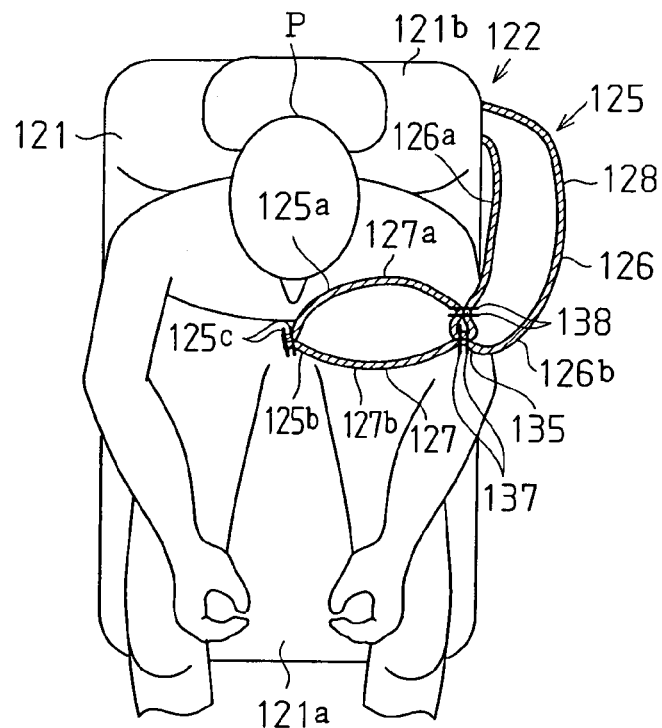
FIG. 5 is a schematic cross-sectional plan view taken along line 5-5 in FIG. 4.
Figure 6A:
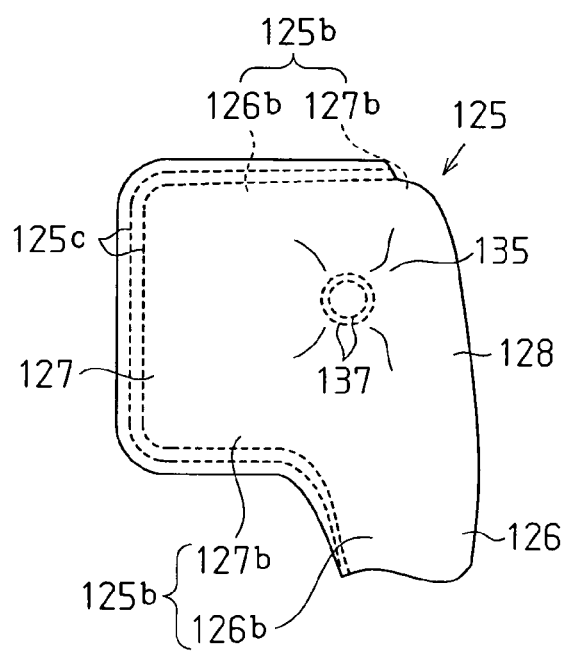
FIG. 6A is a front view showing a state in which the airbag is unfolded and inflated.
Figure 6B:
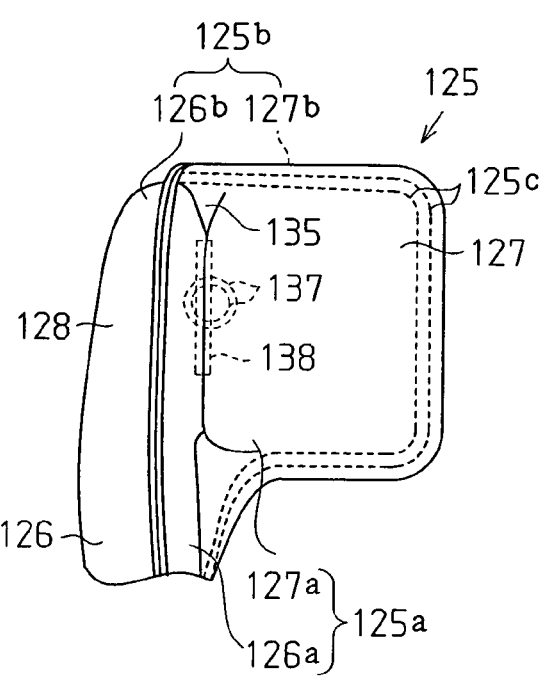
FIG. 6B is a rear view showing a state in which the airbag is unfolded and inflated.

FIG. 4 shows an airbag 125 in a state filled with gas and unfolded and inflated to its maximum. FIGS. 6A and 6B illustrate a projecting portion 127 in a state filled with gas and unfolded and inflated to its maximum. As shown in FIGS. 4 to 6B, the airbag 125 is formed by sewing together the peripheries of a pair of base cloths 125a and 125b, which are made of woven cloths, into a bag shape as a whole. The airbag 125 is normally accommodated in a casing 123 in a folded state. A peripheral seam 125c, which is formed by sewing together the pair of base cloths 125a and 125b with thread, is formed along the periphery of the airbag 125 so as to extend along the outer peripheries of the base cloths 125a and 125b. The base cloth 125a is located on the occupant's side, while the base cloth 125b is located on the vehicle exterior side.

The side airbag device 122 includes an inflator 124, which serves as a gas generator, for unfolding and inflating the airbag 125. The inflator 124 is located in the airbag 125. A gas injection port 124a for injecting gas from the inflator 124 is arranged in the top of the inflator 124. Accordingly, the inflator 124 injects gas toward the upper portion of the airbag 125 through the gas injection port 124a.

The airbag 125 has an airbag body 126 and a projecting portion 127. The airbag body 126 and the projecting portion 127 are connected integrally with each other. A bent portion 135 is defined at the boundary between the airbag body 126 and the projecting portion 127. The projecting portion 127 is bent relative to the airbag body 126 at the bent portion 135. Therefore, the airbag body 126 is unfolded and inflated in the space beside the occupant P between the vehicle body side and the chest to head region of the occupant P. The projecting portion 127, bent relative to the airbag body 126, projects from the front end of the airbag body 126 and is unfolded and inflated in front of the head of the occupant P.

In the description hereafter, the end of the airbag body 126 located closer to the bent portion 135 is referred to as the "distal end", and the end of the airbag body 126 opposite from the distal end, that is, the end located on the side closer to the inflator 124, is referred to as the "basal end". The end of the projecting portion 127 located closer to the bent portion 135 is referred to as the "basal end", and the end opposite from the basal end, that is the end located closest to the head of the occupant P is referred to as the "distal end".

The airbag body 126 has an upper inflation portion 128 for protecting the head to chest region of the occupant P, and a lower inflation portion 129 for protecting the chest to abdomen region of the occupant P. A first thickness restriction portion 136a is defined at the boundary between the upper inflation portion 128 and the lower inflation portion 129 at a position corresponding to the chest of the occupant P. A second thickness restriction portion 136b is defined in the lower inflation portion 129 at a position corresponding to the elbow of the occupant P. These first and second thickness restriction portions 136a and 136b are formed by sewing together the base cloths 125a and 125b so as to join the inner surfaces of the base cloths 125a and 125b.

The projecting portion 127 is formed at the distal end of the airbag body 126 integrally with the upper inflation portion 128. A starting seam 137 is formed at the bent portion 135, which is defined at the boundary between the projecting portion 127 and the upper inflation portion 128, by sewing together the base cloths 125a and 125b without any gaps therebetween. The starting seam 137 is circular, and the projecting portion 127 is bent relative to the upper inflation portion 128 from the starting seam 137. In other words, the upper inflation portion 128 is partitioned from the projecting portion 127 by the starting seam 137 at the bent portion 135. The interior of the upper inflation portion 128 communicates with the interior of the projecting portion 127 at the upper and lower ends of the starting seam 137.

To bend the projecting portion 127 relative to the airbag body 126 when the airbag 125 is unfolded and inflated, the part of the base cloth 125a defining the basal end of the projecting portion 127 is overlapped with the part defining the distal end of the upper inflation portion 128 at the bent portion 135. A joint seam 138 is formed on the base cloth 125a at the overlapping part by sewing together the overlapping parts of the base cloth 125a.

Figure 7A:
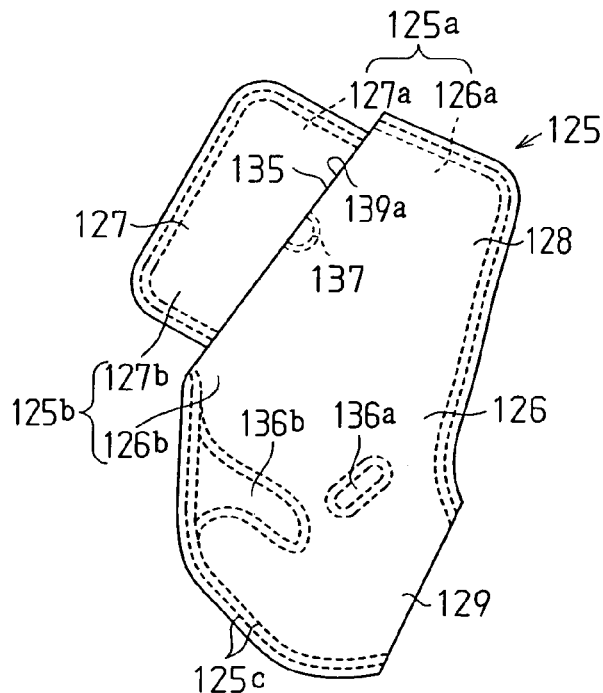
FIGS. 7A and 7B are side views showing a state in which the airbag is unfolded.
Figure 7B:
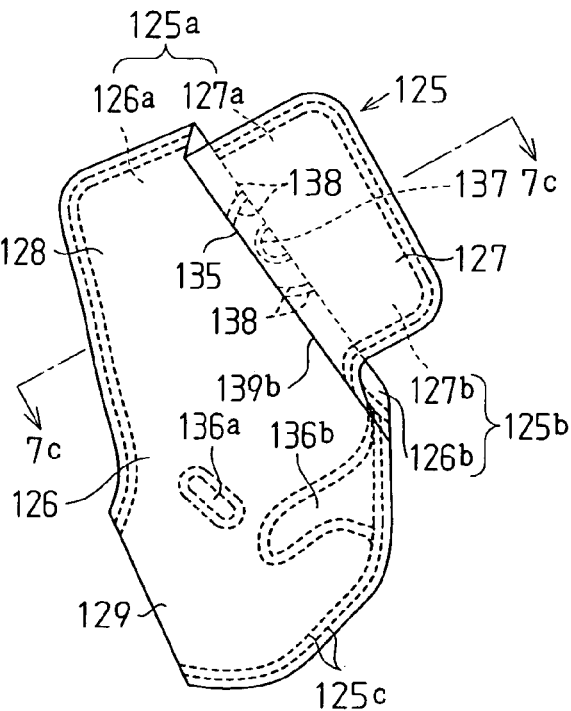
Figure 7C:
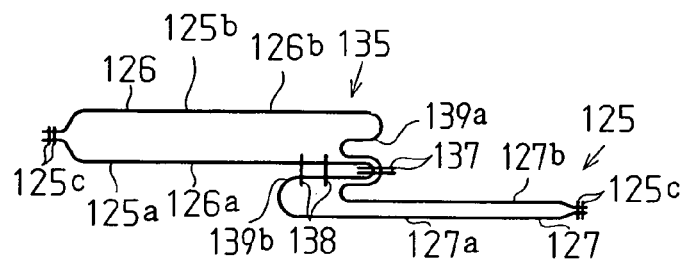
FIG. 7C is an end view taken along line 7C-7C in FIG. 7B.

FIG. 7A shows the airbag 125 in a state unfolded and not filled with gas, as viewed from the exterior of the vehicle. FIG. 7B shows the airbag 125 in a state unfolded and not filled with gas, as viewed from the occupant. FIG. 7C schematically shows the airbag 125 in a state unfolded and not inflated. Further, in FIG. 7C, the inner surfaces of the base cloths 125a and 125b are separated from each other in the airbag body 126 and projecting portion 127 to facilitate understanding. However, the base cloths 125a and 125b are actually in contact with each other when the airbag 125 is unfolded and not inflated.

The projecting portion 127 is formed integrally with the airbag body 126. Thus, the base cloths 125a and 125b are formed by cutting woven cloths or the like into a shape defined by combining the airbag body 126 and projecting portion 127 (into substantially an L-shape in the present embodiment). Accordingly, the base cloths 125a and 125b each have a section for forming the airbag body 126 and a section for forming the projecting portion 127. The peripheral seam 125c is formed along a continuous line connecting the seam formed in the airbag body 126 with the seam formed in the projecting portion 127.

In the base cloth 125a, the section for forming the airbag body 126 is defined as the first body base cloth 126a, and the section for forming the projecting portion 127 is defined as the first projecting base cloth 127a. In the base cloth 125b, the section for forming the airbag body 126 is defined as the second body base cloth 126b, and the section for forming the projecting portion 127 is defined as the second projecting base cloth 127b. The first and second body base cloths 126a and 126b together form the airbag body 126. When the airbag 125 is unfolded and inflated, the first body base cloth 126a is located closer to the occupant P, and the second body base cloth 126b is located farther from the occupant P. The first and second projecting base cloths 127a and 127b together form the projecting portion 127. When the airbag 125 is unfolded and inflated, the first projecting base cloth 127a is located closer to the occupant P, and the second projecting base cloth 127b is located at the farther from the occupant P.

As described above, the starting seam 137 is formed by sewing the base cloths 125a and 125b together at the region defining the bent portion 135. The starting seam 137 is formed such that the length from the basal end to the distal end of the second body base cloth 126b is greater than the length from the basal end to the distal end of the first body base cloth 126a. The basal ends of the first and second body base cloths 126a and 126b are located at the part where these base cloths are sewn together by the peripheral seam 125c, while the distal ends thereof are located at the part where these base cloths are sewn together by the starting seam 137. When the airbag 125 is unfolded but not inflated, the distal end of the second body base cloth 126b becomes slack since the length of the second body base cloth 126b is greater than the length of the first body base cloth 126a. This slack portion is tucked inside the airbag 125 so as to form a first tuck 139a in the distal end of the second body base cloth 126b.

The starting seam 137 is formed such that the length from the basal end to the distal end of the second projecting base cloth 127b is less than the length from the basal end to the distal end of the first projecting base cloth 127a. The basal ends of the first and second projecting base cloths 127a and 127b are located at the part where these base cloths are sewn together by the starting seam 137, while the distal ends thereof are located at the part where these base cloths are sewn together by the peripheral seam 125c. When the airbag 125 is unfolded but not inflated, the basal end of the first projecting base cloth 127a becomes slack since the length of the second projecting base cloth 127b is less than that of the first projecting base cloth 127a. The slack is eliminated by tucking the basal end of the first projecting base cloth 127a inside the airbag 125 in a state spaced from the basal end of the second projecting base cloth 127b. A second tuck 139b is formed by the basal end of the first projecting base cloth 127a that is tucked inside of the airbag 125. The joint seam 138 is formed in the second tuck 139b by sewing the basal end of the first projecting base cloth 127a and the distal end of the first body base cloth 126a together.

Operation of the side airbag device 122 will now be described. When an impact applied to the vehicle body side from a diagonally frontward direction, the airbag body 126 is first unfolded and inflated beside the occupant P. Then, the projecting portion 127 is unfolded and inflated in front of the head of the occupant P.

When the airbag body 126 is unfolded and inflated, the airbag 125 inflates the airbag body 126 so as to unfold the first tuck 139a shown in FIG. 7C. As the first tuck 139a is unfolded, the gas flowing towards the front of the vehicle within the airbag body 126 comes into contact with the first tuck 139a. This deflects the flow of gas in the lateral direction of the vehicle. The deflection of the gas flow applies gas pressure to the projecting portion 127 and urges the projecting portion 127 in the lateral direction of the vehicle (in the direction approaching the occupant P). This unfolds and inflates the projecting portion 127.

When the gas pressure urges the projecting portion 127 in this manner, the starting seam 137, which is formed by sewing the base cloths 125a and 125b together, prevents the base cloths 125a and 125b from being displaced relative to each other. Since the length of the first body base cloth 126a is less than that of the second body base cloth 126b (see FIG. 7C), tension is applied to the first body base cloth 126a to pull the basal end of the projecting portion 127 towards the rear of the vehicle. As a result, the projecting portion 127 urged by the gas pressure is bent relative to the airbag body 126 at the bent portion 135 from the starting seam 137.

When the projecting portion 127 is unfolded and inflated, the airbag 125 inflates the projecting portion 127 without unfolding the second tuck 139b shown in FIG. 7C due to the joint seam 138. The joint seam 138 inhibits the unfolding of the second tuck 139b. Thus, the gas flowing in the lateral direction of the vehicle within the projecting portion 127 reaches the distal end of the projecting portion 127 without any interference. Additionally, since the second projecting base cloth 127b is shorter than the first projecting base cloth 127a (see FIG. 7C), tension is applied to the second projecting base cloth 127b to prevent the distal end of the projecting portion 127 from being displaced in the longitudinal direction of the vehicle. Further, the first projecting base cloth 127a, which is longer than the second projecting base cloth 127b, provides space for inflating the projecting portion 127 toward the inner side of the bent airbag (inflating space) and bends the projecting portion 127 positively relative to the airbag body 126 when the projecting portion 127 is unfolded and inflated. As a result, the projecting portion 127 is unfolded and inflated in front of the head of the occupant P in a state held bent relative to the airbag body 126. Thus, the airbag 125 is unfolded and inflated as shown in FIGS. 4 and 5.

In addition to the advantage (1) mentioned above, the second embodiment has the advantages described below.

(3) The airbag 125 is provided with the starting seam 137 at the bent portion 135. Referring to FIGS. 5 and 7C, in a horizontal cross sectional plane, the length of the second body base cloth 126b from the starting seam 137 to the peripheral seam 125c of the airbag body 126 is greater than the length of the first body base cloth 126a from the starting seam 137 to the peripheral seam 125c of the airbag body 126. In the projecting portion 127, in horizontal cross sectional plane, the length of the first projecting base cloth 127a from the starting seam 137 to the peripheral seam 125c of the projecting portion 127 is greater than the length of the second projecting base cloth 127b from the starting seam 137 to the peripheral seam 125c of the projecting portion 127. Accordingly, the projecting portion 127 is easily bent relative to the airbag body 126 at the bent portion 135.

(4) The joint seam 138 between the distal end of the first body base cloth 126a and the basal end of the first projecting base cloth 127a ensures that the projecting portion 127 is bent relative to the airbag body 126 when the projecting portion 127 is unfolded and inflated. If the joint seam 138 is omitted, the distal end of the first body base cloth 126a and the basal end of the first projecting base cloth 127a would expand and pull against each other so as to compete for inflation space when the second tuck 139b unfolds. In other words, the projecting portion 127 may not be bent positively relative to the airbag body 126 due to the expansion of the first projecting base cloth 127a.

(5) In the airbag 125 of the second embodiment, the airbag projecting portion 127 is bent relative to the airbag body 126 by means of the starting seam 137 and the joint seam 138 without using the planar tether 32. Accordingly, the thickness of the airbag 125 when it is folded and not inflated may be less than that of the airbag of the first embodiment for an amount corresponding to the thickness of the eliminated planar tether 32. Thus, the airbag 125 may be compactly folded, and the folded airbag 125 may easily be accommodated in the casing 123. Additionally, the compactly folded airbag 125 makes it possible to reduce the size of the side airbag device 122.

A third embodiment of the present invention will now be described in detail with reference to FIGS. 8 to 11B. In the description of the third embodiment, elements similar to those of the first embodiment are denoted by reference numerals obtained by adding '200' to the corresponding reference numerals of the first embodiment. Such elements will not be described in detail.

Figure 8:
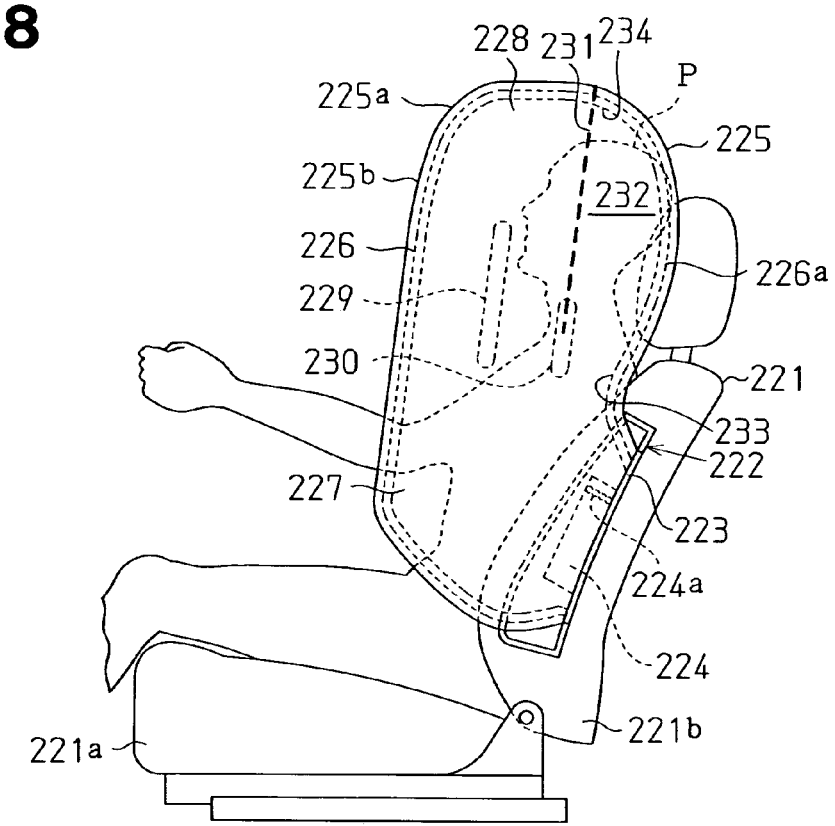
FIG. 8 is a side view showing a state in which an airbag according to a third embodiment is unfolded and inflated.
Figure 9:
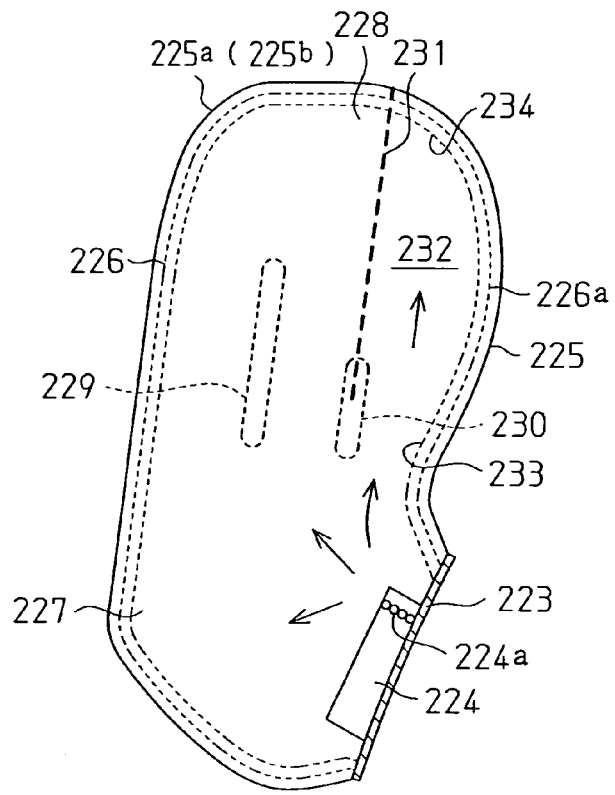
FIG. 9 is a partial cross-sectional view showing the airbag.

As shown in FIGS. 8 and 9, an airbag 225 is formed by sewing together the peripheries of a pair of base cloths 225a and 225b, which are made of woven cloths or the like, into a bag shape. Therefore, the airbag 225 has a peripheral sewn portion 226 formed by sewing the peripheries of the base cloths 225a and 225b. The airbag 225 is normally accommodated in a casing 223 in a folded state, and is unfolded and inflated in a space between the vehicle body side and the head to chest region of an occupant P.

The airbag 225 has a main unfolding portion 227, which is unfolded and inflated beside the chest of the occupant P, and a secondary unfolding portion 228, which is unfolded and inflated beside the head of the occupant P. The main unfolding portion 227 and the secondary unfolding portion 228 are formed integrally. Thus, the main unfolding portion 227 and the secondary unfolding portion 228 communicate with each other and form a single bag. An inflator 224 is arranged at the rear end of the main unfolding portion 227. The secondary unfolding portion 228 incorporates a long tether 229 and a short tether 230 for controlling the thickness of the secondary unfolding portion 228 when the secondary unfolding portion 228 is unfolded and inflated. Specifically, the long tether 229 and the short tether 230 are formed to bridge the inner surfaces of the base cloths 225a and 225b. The long tether 229 is longer than the short tether 230. The long tether 229 and the short tether 230 are arranged at a central portion of the lower end of the secondary unfolding portion 228 and are spaced from each other by a predetermined distance. Both of the tethers 229 and 230 extend vertically. The tethers 229 and 230 each have the same width of its respective entire length. The short tether 230 is located rearward from the long tether 229 and from the middle of the secondary unfolding portion 228.

The base cloths 225a and 225b are sewn and joined together to form a tear seam 231, which serves as a fragile portion, extending vertically and substantially linearly above the short tether 230. The lower end of the tear seam 231 overlaps with the upper end of the short tether 230, while the upper end of the tear seam 231 reaches the upper end of the secondary unfolding portion 228. The tear seam 231, which is formed from a fragile thread, tears under the gas pressure from the inflator 224 when the secondary unfolding portion 228 is unfolded and inflated. To tear the tear seam 231 at desirable timing when the secondary unfolding portion 228 unfolds and inflates, the tear seam 231 preferably has a stitching pitch of 4 mm or longer but 8 mm or less, and the fragile thread preferably is made of polyester having 840 deniers.

In this embodiment, a pocket 232 is formed by the short tether 230, the tear seam 231, and a rear peripheral sewn portion 226a, which is defined in the peripheral sewn portion 226 located on the rearward from the tear seam 231 in the secondary unfolding portion 228. In other words, the short tether 230, the rear peripheral sewn portion 226a, and the tear seam 231 each form part of the pocket 232. Accordingly, the pocket 232 is formed in the secondary unfolding portion 228 in an area located rearward from the middle of the secondary unfolding portion 228. The pocket 232 has an opening 233 formed between the lower end of the short tether 230 and the lower end of the rear peripheral sewn portion 226a. The opening 233 opens toward the gas injection port 224a of the inflator 224. The innermost part 234 of the pocket 232 is located opposite to the gas injection port 224a of the inflator 224 as viewed from the opening 233. The pocket 232 is formed so as to become wider and then narrower from the opening 233 towards the innermost part 234.

Figure 10A:
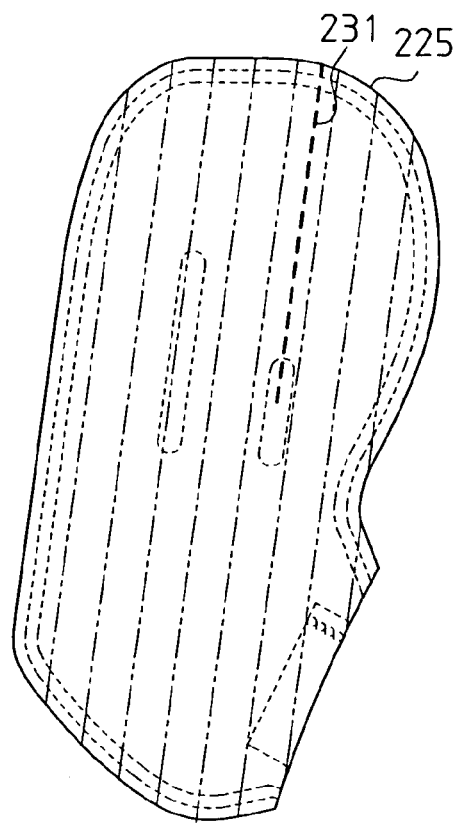
FIG. 10A is a side view showing how the airbag is folded.
Figure 10B:
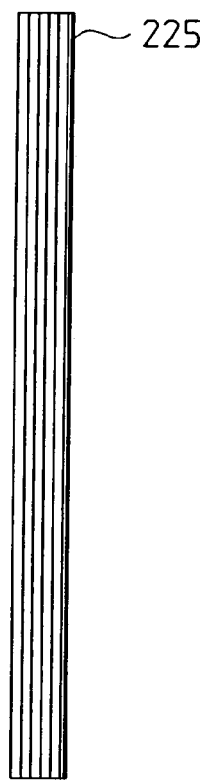
FIG. 10B is a front view showing how the airbag is folded.
Figure 11A:
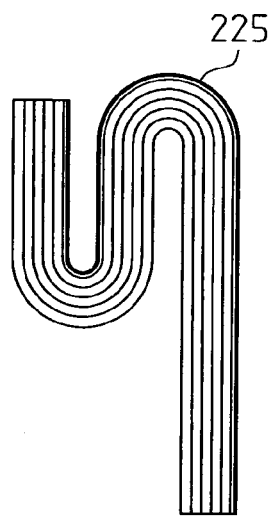
FIGS. 11A and 11B are front views showing how the airbag is folded.
Figure 11B:
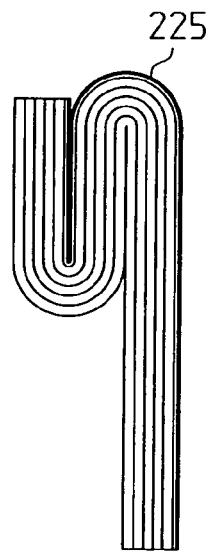

The folding of the airbag 225 to store the airbag 225 in a casing 223 will now be described. As shown in FIG. 10A, before being folded, the airbag 225 is flat when spread out without supplying gas. The airbag 225 is first folded in an accordion-like manner from the rear end to the front end in the direction in which the airbag 225 is unfolded and inflated. The airbag 225 is repeatedly folded into alternate ridges and valleys along a plurality of parallel folding lines as shown by the broken lines in FIG. 10A. This folds the airbag 225 as shown in the state of FIG. 10B. The upper end of the folded airbag 225 is then bent downward and then upward so that the upper end of the airbag 225 is S-shaped as shown in the state of FIG. 11A. The airbag 225 is compressed in this state from opposite sides to reduce the volume of the airbag 225 as shown in the state of FIG. 11B so that it can be accommodated in the casing 223.

The operation of the side airbag device 222 will now be described with reference to FIGS. 8 and 9. The airbag 225 is unfolded and inflated through two stages, an initial stage, in which the main unfolding portion 227 is unfolded and inflated, and a final stage, in which the secondary unfolding portion 228 is unfolded and inflated.

When an impact greater than a predetermined value is applied to the vehicle body side, gas is injected and supplied into the airbag 225 through the gas injection port 224a of the inflator 224 as shown by the arrows in FIG. 9. When the airbag 225 starts to unfold and inflate, the main unfolding portion 227 is unfolded and inflated by pressure of the gas beside the chest of the occupant P. At the same time, some of the gas enters the pocket 232 through the opening 233. The gas pressure forcing the airbag 225 forward is reduced by at least the gas entering the pocket 232. The gas entering the pocket 232 is blocked by the pocket 232. Thus, the innermost part 234 of the pocket 232 is forced upward by the pressure of the gas and the airbag 225.

As the airbag 225 finally becomes completely unfolded and inflated, the gas filling the pocket 232 increases the pressure in the pocket 232. When the gas pressure exceeds the stitch strength of the tear seam 231 formed by the fragile thread, the tear seam 231 is torn open and the pocket 232 stops blocking the gas. As a result, the gas passes through the pocket 232 and flows into the entire secondary unfolding portion 228. The secondary unfolding portion 228 is thus unfolded and inflated rapidly above the main unfolding portion 227 (beside the head of the occupant P).

Accordingly, when unfolded and inflated, the pocket 232 functions to prevent the airbag 225 (especially the secondary unfolding portion 228) from moving away in the forward direction from its predicted position. This optimally controls the unfolding and inflation position of the airbag 225. Thus, the occupant P is effectively protected by the airbag 225.

The third embodiment has the advantages described below.

(6) In the initial stage of unfolding and inflation, the pocket 232 blocks the gas injected from the inflator 224. The pocket 232 receives the pressure of the gas. This moves the airbag 225 (especially the secondary unfolding portion 228) upwards (in the direction towards the innermost part of the pocket 232) and facilitates the upward unfolding of the airbag 225. In addition, the gas pressure forcing the airbag 225 forward is reduced by blocking the gas with the pocket 232.

In the final state of unfolding and inflation, the pressure of the gas blocked by the pocket 232 is increased. This tears open the tear seam 231 with the gas pressure so that the gas passes through the pocket 232 to rapidly unfold and inflate the secondary unfolding portion 228. Accordingly, when the airbag 225 is unfolded and inflated, the airbag 225 (especially the secondary unfolding portion 228) is prevented from moving away in the forward direction away from its predicted position. This optimally controls the position where the airbag 225 is unfolded and inflated.

(7) The tear seam 231 is easily stitched with fragile thread.

(8) The pocket 232 is formed in the secondary unfolding portion 228 in an area rearward from the middle of the secondary unfolding portion 228. Thus, the pressure of gas from the inflator 224 is optimally received by the pocket 232. This obtains the optimal force for unfolding the airbag 225 upwards. Consequently, when unfolded and inflated, the airbag 225 (especially the secondary unfolding portion 228) is effectively prevented from moving forwardly away from its predicted position.

(9) The pocket 232 is formed so as to become wider and then narrower from the opening 233 towards the innermost part 234, and the volume of the pocket 232 is smaller than the other parts of the airbag 225. Therefore, the pocket 232 is unfolded and inflated more rapidly than the rest of the airbag 225. This controls the direction of unfolding and inflation of the airbag 225 so that the airbag 225 enters the space between the vehicle body side and the occupant P. The airbag 225 is thus rapidly and smoothly unfolded and inflated.

(10) The rear peripheral sewn portion 226a and the short tether 230 form part of the pocket 232. This facilitates formation and enlargement of the pocket 232.

(11) The airbag 225 is provided with the long tether 229 and the short tether 230. This optimally controls the thickness of the airbag 225 when the airbag 225 is unfolded and inflated and effectively protects the occupant P.

(12) The airbag 225 is accommodated in the casing 223 in a state in which the airbag 225 is folded in an accordion-like manner in the unfolding and inflation direction, and the secondary unfolding portion 228 is folded downward. Accordingly, when the airbag 225 is unfolded and inflated, the downwardly folded secondary unfolding portion 228 is easily unfolded upwards. As a result, the airbag 225, especially the secondary unfolding portion 228 is prevented from being moved forwardly away from its predicted unfolding and inflation position (i.e., the position beside the head of the occupant P).

A fourth embodiment of the present invention will now be described in detail with reference to FIGS. 12 and 13. In the description of the fourth embodiment, elements similar to those of the first embodiment are denoted by adding '300' to the corresponding reference numerals of the first embodiment. Such elements will not be described in detail.

Figure 12:
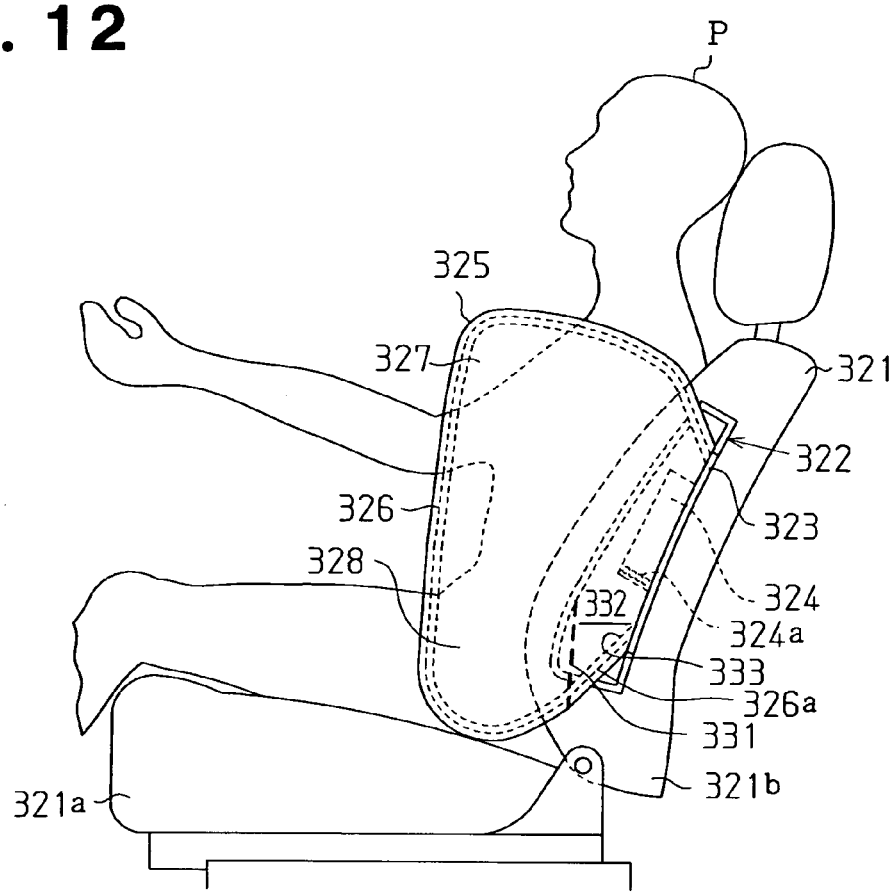
FIG. 12 is a side view showing a state in which an airbag according to a fourth embodiment is unfolded and inflated.
Figure 13:
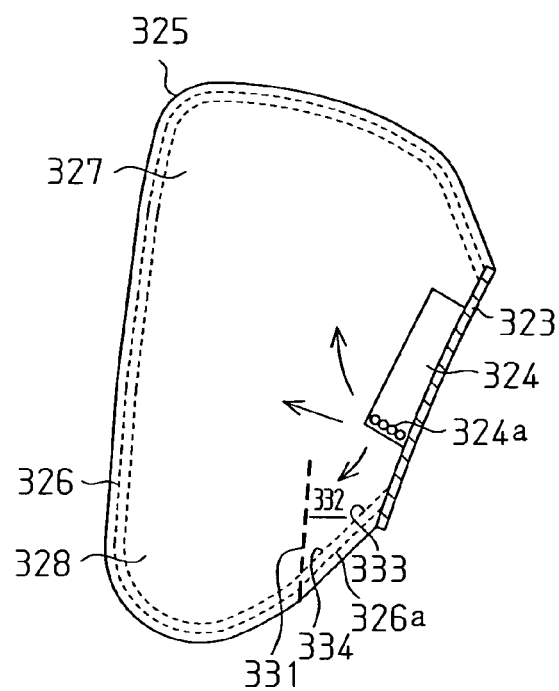
FIG. 13 is a partial cross-sectional view showing the airbag.

As shown in FIG. 12, an airbag 325 of the fourth embodiment is unfolded and inflated in the space between the vehicle body side and the chest to hip region of an occupant P. As shown in FIGS. 12 and 13, the airbag 325 includes a main unfolding portion 327, which is unfolded and inflated beside the chest of the occupant P, and a secondary unfolding portion 328, which is unfolded and inflated beside the hip of the occupant P. The main unfolding portion 327 and the secondary unfolding portion 328 are integrally formed. An inflator 324 is arranged at the rear end of the main unfolding portion 327. In this embodiment, a gas injection port 324a is arranged at the bottom of the inflator 324.

A tear seam 331 extending vertically is formed in an area located rearward from the middle of the secondary unfolding portion 328. The upper end of the tear seam 331 is lower than the gas injection port 324a of the inflator 324, and the lower end of the tear seam 331 reaches the lower end of the secondary unfolding portion 328. Accordingly, a pocket 332 is formed by the tear seam 331 and a rear peripheral sewn portion 326a in the peripheral sewn portion 326 that is located rearward from the tear seam 331 in the secondary unfolding portion 328. An opening 333 is formed at the upper end of the pocket 332, and the opening 333 opens toward the gas injection port 324a of the inflator 324.

The folding of the airbag 325 of the fourth embodiment to store the airbag 325 in a casing 323 will now be described. In the same manner as the airbag 225 of the third embodiment, the airbag 325 of the fourth embodiment is folded in an accordion-like manner along the unfolding and inflation direction. Then, in a manner reversed from the airbag 225 of the third embodiment, the lower end of the airbag 325 of the fourth embodiment bent upward and then downward. Subsequently, the airbag 325 of the fourth embodiment is compressed in the same manner as the airbag 225 of the third embodiment.

The operation of the side airbag device 322 of the fourth embodiment will now be described with reference to FIGS. 12 and 13. When an impact greater than a predetermined value is applied to the vehicle body side, gas is injected and supplied into the airbag 325 through the gas injection port 324a of the inflator 324 as shown by the arrows in FIG. 13. In the initial stage of unfolding and inflation of the airbag 325, the main unfolding portion 327 is unfolded and inflated by the pressure of the supplied gas, while some of the gas enters the pocket 332 through the opening 333. The gas pressure forcing the airbag 325 forward is reduced by at least the gas entering the pocket 332. The gas entering the pocket 332 is blocked by the pocket 332, and the innermost part 334 of the pocket 332 is forced downward by the pressure of the gas.

In the final stage of unfolding and inflation of the airbag 325, the pocket 332 is filled with gas and the gas pressure in the pocket 332 is increased. When the gas pressure exceeds the stitch strength of the tear seam 331 made of fragile thread, the tear seam 331 is torn open by the gas pressure. Thus, the gas is no longer blocked by the pocket 332 and passes through the pocket 332 and quickly flows throughout the secondary unfolding portion 328. Thus, the secondary unfolding portion 328 is rapidly unfolded and inflated beside the hip of the occupant P.

Accordingly, when unfolded and inflated, the pocket 332 functions to prevent the airbag 325 (especially, the secondary unfolding portion 328) from being moved forwardly away from its predicted position. This optimally controls the unfolding and inflation of the airbag 325. As a result, the occupant P is effectively protected by the airbag 325.

The fourth embodiment has the advantages described below.

(13) In the initial stage of unfolding and inflation, the airbag 325 is forced downward by the pocket 332 that receives the gas pressure. This facilitates the downward unfolding of the airbag 325.

In the final stage of expansion and inflation, the tear seam 331 is torn open by the gas pressure so that gas passes through the pocket 332 to rapidly unfold and inflate the secondary unfolding portion 328. Accordingly, when unfolded and inflated, the airbag 325 (especially, the secondary unfolding portion 328) is prevented from being moved forwardly away from its predicted position.

(14) The airbag 325 is accommodated in the casing 323 in a state in which the airbag 325 is folded in an accordion-like manner along the unfolding and inflation direction with the secondary unfolding portion 328 bent upward. This facilitates the downward unfolding of the secondary unfolding portion 328. Therefore, the secondary unfolding portion 328 of the airbag 325 is prevented from being moved forwardly away from its predicted position (i.e., from the position beside the hip of the occupant P) during unfolding and inflation.

It should be apparent to those skilled in the art that the present invention may be embodied in many other specific forms without departing from the spirit or scope of the invention. Particularly, it should be understood that the present invention may be embodied in the following forms.

The planar tether 32 of the first embodiment may be omitted.

The two belt-shaped tethers 31 of the first embodiment may be replaced by seams formed at the corresponding portions by sewing together the base cloths 25a and 25b. In this case, the number of seams may be three or more.

The side airbag device 22 of the first embodiment may be arranged in locations other than the backrest 21b of the front seat 21, such as, in the seating portion 21a, a door trim, a head rest, a front pillar, or a dashboard. In the same manner as in the first embodiment, in the second embodiment, the side airbag device 122 may be arranged in a location other than in the backrest 121b of the front seat 121. Also in the third and fourth embodiments, like in the first embodiment, the side airbag devices 222 and 322 may be arranged in a location other than in the backrests 221b and 322b. For example, the side airbag device 222 of the third embodiment may be installed in a rear seat of the vehicle so that the airbag 225 is unfolded and inflated in the space between the vehicle body side and an occupant P seated in the rear seat.

Figure 14:
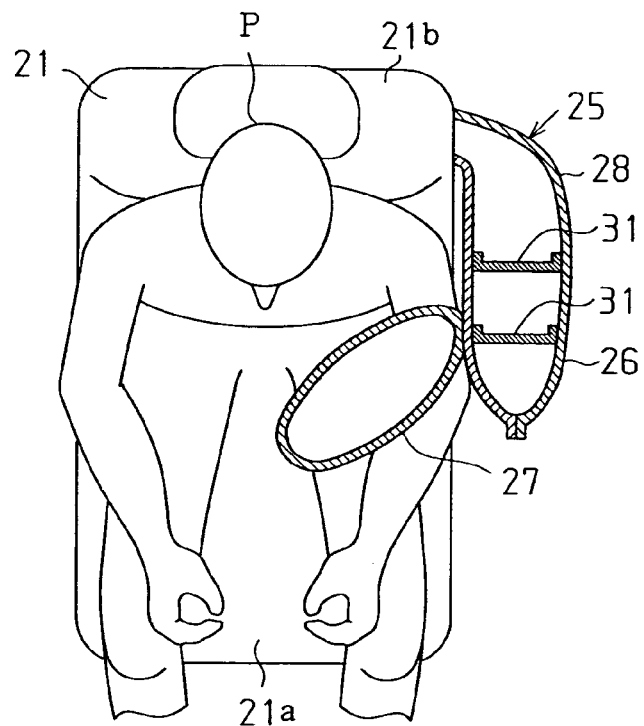
FIG. 14 is schematic cross-sectional plan view corresponding to FIG. 2 showing a state in which an airbag according to a first modification is unfolded and inflated.

As long as the projecting portion 27 of the first embodiment is unfolded and inflated in a diagonally frontward direction of the occupant P, the projecting portion 27 may be arranged in a location other than the front end of the upper inflation portion 28. For example, as shown in FIG. 14, the projecting portion 27 may be arranged at the intermediate portion of the upper inflation portion 28 on the passenger compartment side outer surface of the upper inflation portion 28. Also in the second embodiment, like in the first embodiment, the projecting portion 127 may be arranged at a location other than the front end of the upper inflation portion 28. Although FIG. 14 shows two belt-shaped tethers 31 like in the first embodiment, these belt-shaped tethers 31 may be omitted.

Figure 15:
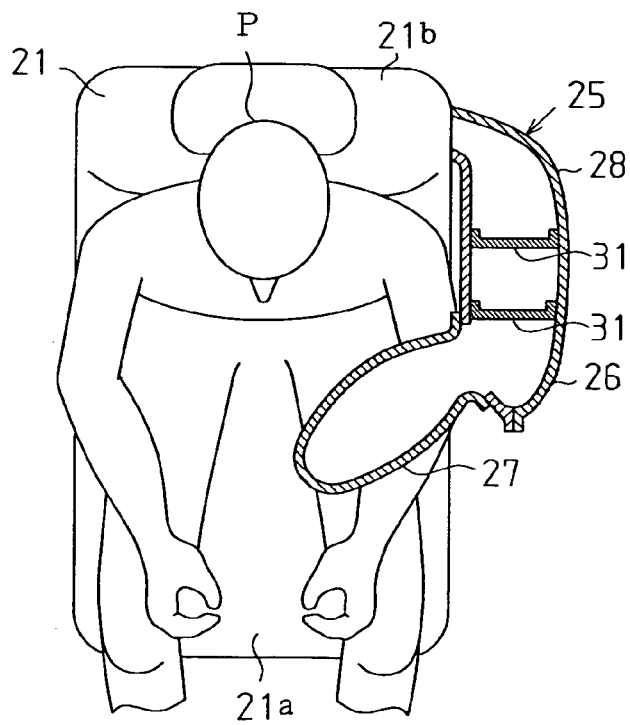
FIG. 15 is a schematic cross-sectional plan view corresponding to FIG. 2 showing a state in which an airbag according to a second modification is unfolded and inflated.

As shown in FIG. 15, the projecting portion 27 and the airbag body 26 of the first embodiment may be formed from separate base cloths and then be connected to each other. Also in the second embodiment, like in the first embodiment, the projecting portion 127 and the airbag body 126 may be formed from separate base cloths and then be connected to each other. Although FIG. 15 shows two belt-shaped tethers 31 like the first embodiment, these belt-shaped tethers 31 may be omitted like in the second embodiment.

Figure 16:
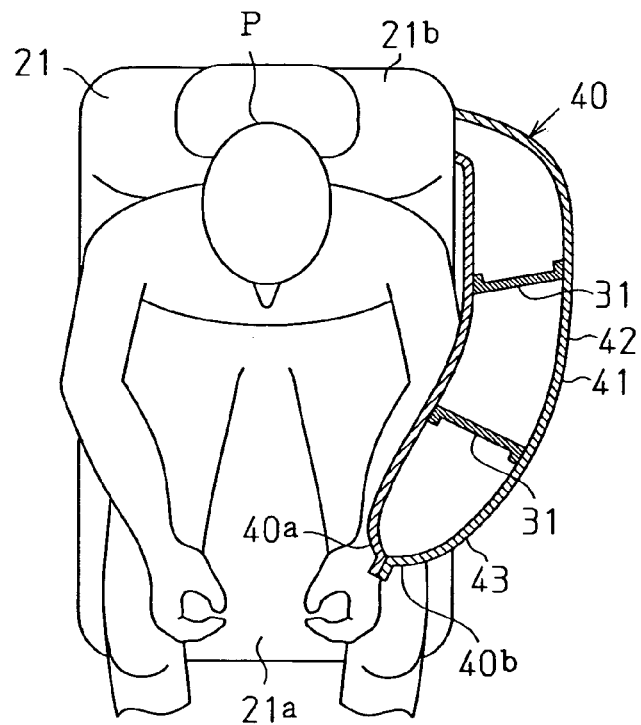
FIG. 16 is a schematic cross-sectional plan view corresponding to FIG. 2 showing a state in which an airbag according to a third modification is unfolded and inflated.

As shown in FIG. 16, an airbag 40 of the first embodiment may be designed such that an upper inflation portion 42 is partitioned from a projecting portion 43 by the front belt-shaped tether 31 of a pair of belt-shaped tethers 31. In this case, the airbag 40 is bag-shaped and formed by sewing two base cloths 40a and 40b together. The base cloths 40a and 40b are linked with each other by the pair of belt-shaped tethers 31 inside the upper inflation portion 42. Therefore, each of the belt-shaped tethers 31 has an outer edge and an inner edge for linking the two base cloths 40a and 40b. The pair of belt-shaped tethers 31 are spaced from each other by a predetermined distance in the longitudinal direction of the vehicle. The projecting portion 43 is adjacent to the front side of the front belt-shaped tether 31. Thus, the upper inflation portion 42 is partitioned from the projecting portion 43 by the front belt-shaped tether 31. The distance between the outer edges of the belt-shaped tethers 31 is greater than the distance between the inner edges of the belt-shaped tethers 31.

When an impact is applied to the vehicle from a diagonally frontward direction, the airbag 40 is unfolded and inflated as it curves into the passenger compartment due to the belt-shaped tethers 31 restricting the unfolding of the base cloths 40a and 40b and due to sizing and shaping of the parts of the airbag 40. Consequently, the airbag body 41 is unfolded and inflated beside the head and chest of the occupant P, and the projecting portion 43 is unfolded and inflated in front of the head of the occupant P. In other words, the airbag 40 is unfolded and inflated in the space diagonally in front of the occupant P. This improves performance in protecting the head of the occupant P against an object that may enter the passenger compartment during a collision that hits the vehicle from a diagonally frontward direction.

Figure 17:
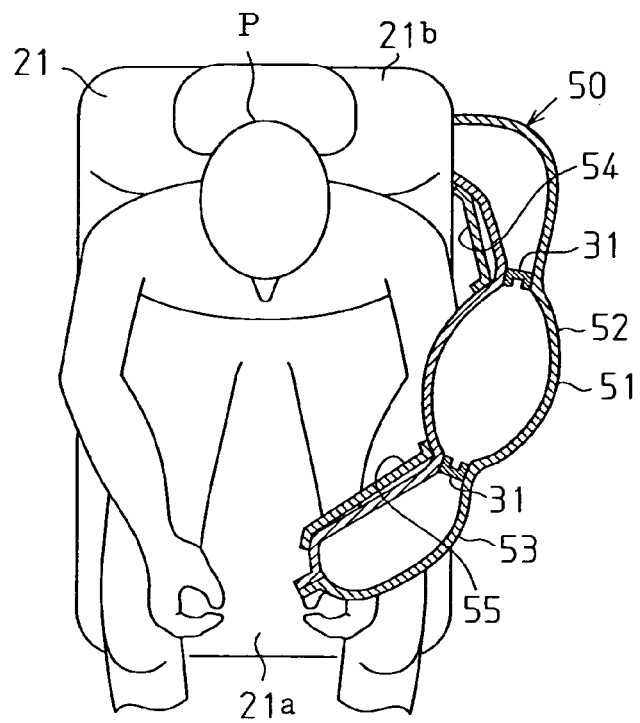
FIG. 17 is a schematic cross-sectional plan view corresponding to FIG. 2 showing a state in which an airbag according to a fourth modification is unfolded and inflated.

As shown in FIG. 17, an airbag 50 of the first embodiment may be designed such that an upper inflation portion 52 of an airbag body 51 is partitioned from a projecting portion 53 by the front one of a pair of belt-shaped tethers 31. Further, the rear end and a central portion of the passenger compartment side of the upper inflation portion 52 may be connected to each other by a planar tether 54, and the front end of the upper inflation portion 52 and the front end of the projecting portion 53 may be linked by a planar tether 55.

Accordingly, the airbag 50 is curved into the passenger compartment at locations where the planar tethers 54 and 55 are provided during unfolding and inflation of the airbag 50. Thus, the projecting portion 53 is unfolded and inflated to project into the space in front of the head of the occupant P.

Figure 18:
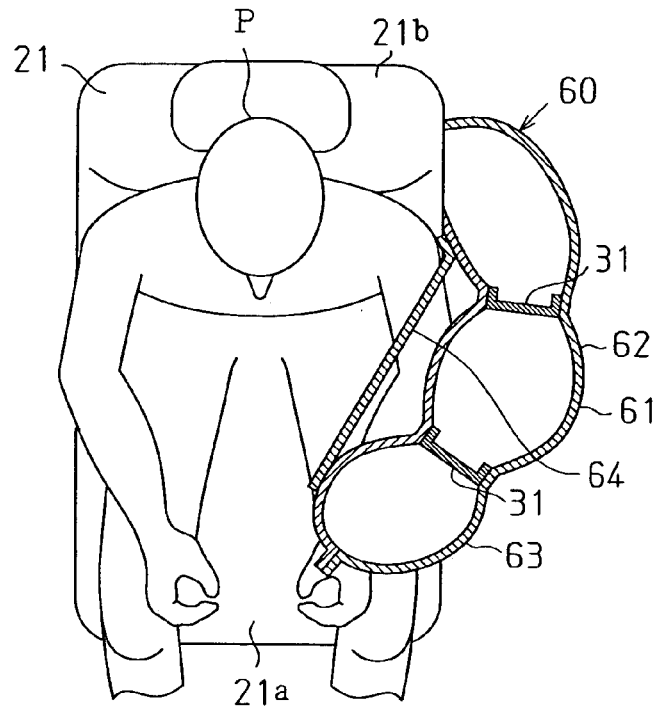
FIG. 18 is a schematic cross-sectional plan view corresponding to FIG. 2 showing a state in which an airbag according to a fifth modification is unfolded and inflated.

As shown FIG. 18, an airbag 60 of the first embodiment may be designed such that an upper inflation portion 62 of the airbag body 61 is partitioned from a projecting portion 63 by the front one of a pair of belt-shaped tethers 31. Additionally, a planar tether 64 may be provided to connect the rear end of the upper inflation portion 62 with the front end of the projecting portion 63 at the passenger compartment side of the airbag 60.

Accordingly, the airbag 60 may be curved into the passenger compartment at the location of the planar tether 64 during unfolding and inflation of the airbag 60. Therefore, the projecting portion 63 is unfolded and inflated to project into the space in front of the head of the occupant P.

Figure 19:
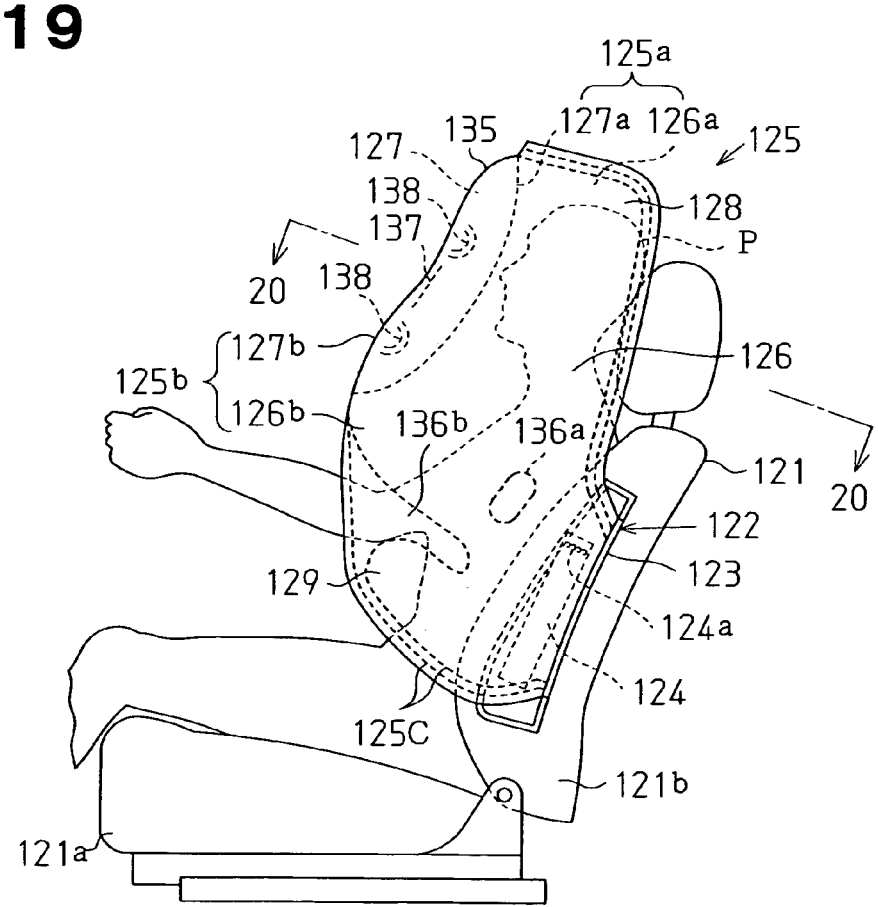
FIG. 19 is a side view showing a state in which an airbag according to a sixth modification is unfolded and inflated.
Figure 20:
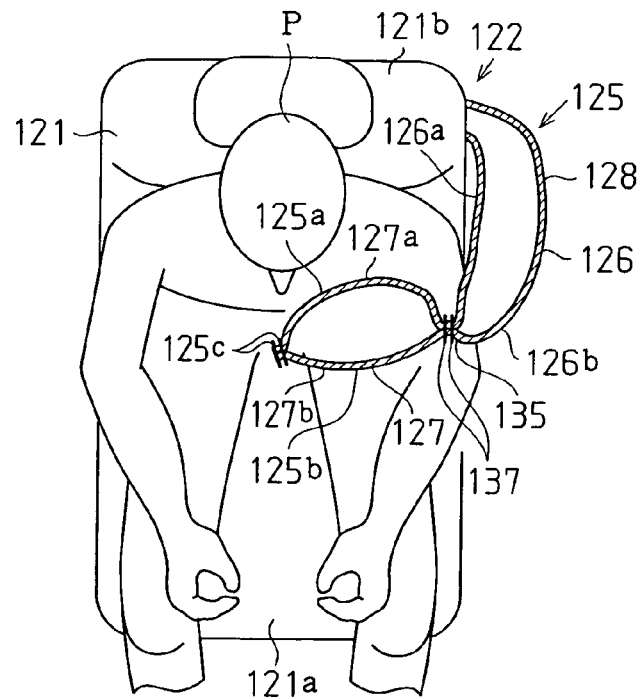
FIG. 20 is schematic cross-sectional plan view taken along line 20-20 in FIG. 19.

In the second embodiment, the joint seam 138 does not necessarily have to be U-shaped and may have any shape as long as it restricts the unfolding of the second tuck 139b. For example, as shown in FIGS. 19 and 20, upper and lower joint seams 138 may be provided on opposite sides of the starting seam 137. The joint seams 138 may have a semicircular shape. This would facilitate formation of the joint seams 138.

In the second embodiment, the joint seam 138 may be omitted. This would facilitate formation of the airbag 125.

In the third embodiment, the secondary unfolding portion 228 may be provided at both the upper and lower sides of the main unfolding portion 227. More specifically, a secondary unfolding portion 228 unfolded and inflated beside the head of the occupant P may be provided on the upper side of the main unfolding portion 227, and another secondary unfolding portion 228 unfolded and inflated beside the hip of the occupant P may be provided on the lower side of the main unfolding portion 227. Also in the fourth embodiment, like in the third embodiment, the secondary unfolding portion 328 may be provided at both the upper and lower sides of the main unfolding portion 327.

In the third embodiment, at least one of the long tether 229 and the short tether 230 may be omitted. Also in the fourth embodiment, like in the third embodiment, at least one of the long tether 329 and the short tether 330 may be omitted.

Figure 21A:
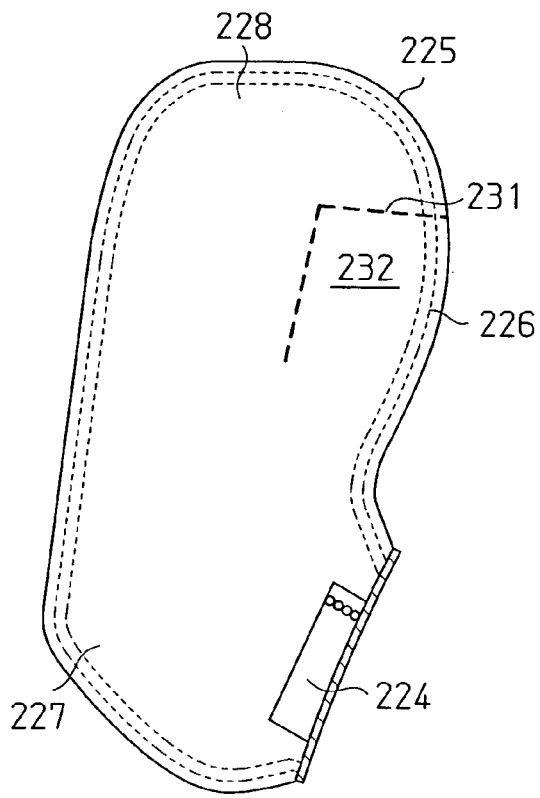
FIG. 21A is a partial cross-sectional view showing an airbag according to a seventh modification.

In the third embodiment, as shown in FIG. 21A, the tear seam 231 may have a reversed L-shape, and the pocket 232 may be provided by the tear seam 231 and the peripheral sewn portion 226.

Figure 21B:
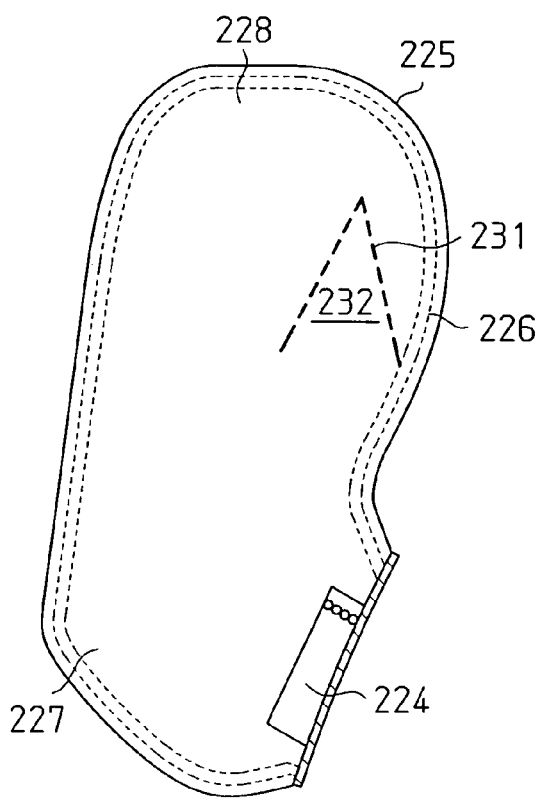
FIG. 21B is a partial cross-sectional view showing an airbag according to an eighth modification.
Figure 22A:
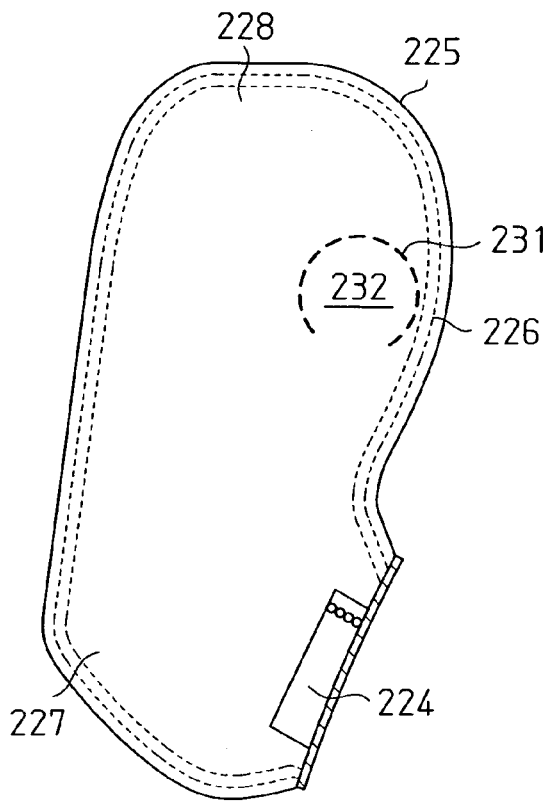
FIG. 22A is a partial cross-sectional view showing an airbag according to a ninth modification.
Figure 22B:
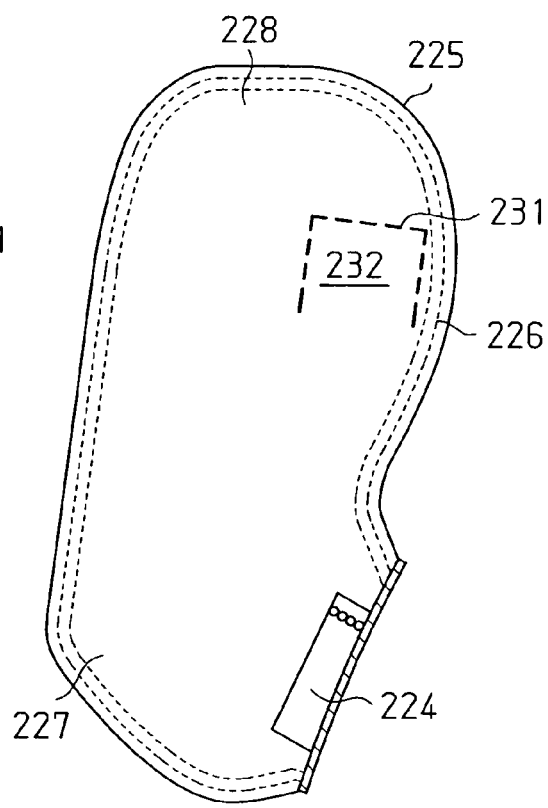
FIG. 22B is a partial cross-sectional view showing an airbag according to a tenth modification.

The shape of the tear seam 231 of the third embodiment may be modified. For example, the tear seam 231 may have a reversed V-shape as shown in FIG. 21B or a C-shape as shown in FIG. 22A. Further, the tear seam 231 may have a reversed U-shape as shown in FIG. 22B. Also in the fourth embodiment, the shape tear seam 331 may be modified like in the third embodiment.

Figure 23:
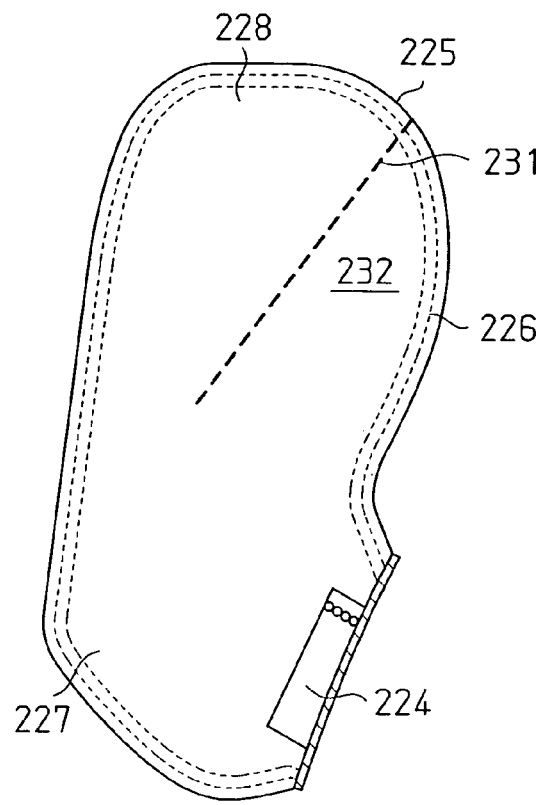
FIG. 23 is a partial cross-sectional view showing an airbag according to an eleventh modification.

In the third embodiment, the tear seam 231 may be formed linearly to extend from the rear of the upper end of the secondary unfolding portion 228 to the middle of the upper end of the main unfolding portion 227 as shown in FIG. 23, and the pocket 232 may be formed by the tear seam 231 and the peripheral sewn portion 226. In this case, the strength of the fragile thread forming the tear seam 231 may be gradually increased towards the rear end of the tear seam 231. When formed in this manner, the tear seam 231 is rapidly torn open from its front end in the final stage of expansion and inflation of the airbag 225, and the time required for unfolding and inflating the entire secondary unfolding portion 228 is shortened.

In the third embodiment, the upper end of the airbag 225 need not be bent when folding the airbag 225. Also in the fourth embodiment, like in the third embodiment, the lower end of the airbag 325 need not be bent when folding the airbag 325.

Referring to FIG. 1, the tear seam 231 of the third embodiment may be formed on the top side of the rear one of the two belt-shaped tethers 31. In this case, the lower end of the tear seam 231 overlaps with the upper end of the belt-shaped tether 31, while the upper end of the tear seam 231 reaches the upper end of the upper inflation portion 28. Referring to FIG. 4, the tear seam 231 of the third embodiment may be formed in an area rearward from the middle of the upper inflation portion 128. The upper end of the tear seam 231 reaches the upper end of the upper inflation portion 128. When formed in this manner, the side airbag devices 22 and 122 of the first and second embodiments have the same advantages as the side airbag device 222 of the third embodiment.

The present examples and embodiments are to be considered as illustrative and not restrictive, and the invention is not to be limited to the details given herein, but may be modified within the scope and equivalence of the appended claims.

What is claimed is:

1. A side airbag device for providing protection in a space between a vehicle occupant and a body side of a vehicle when the occupant is seated on a vehicle seat in a passenger compartment, the side airbag device comprising:
    a gas generator; and
    an airbag for unfolding and inflating by gas supplied from the gas generator, wherein the airbag unfolds and inflates in a space diagonally in front of the occupant seated on the seat, the airbag including:
        an airbag body for unfolding and inflating beside the occupant in the space between the occupant and the vehicle body side, wherein the airbag body includes
            an upper inflation portion for protecting a head to neck region of the occupant; and
        a projecting portion for unfolding and inflating inward of the vehicle from the upper inflation portion
        a pair of base cloths sewn together into the shape of a bag to form the airbag, one base cloth being located closer to the occupant and the other cloth being located farther from the occupant when the air bag is unfolded and inflated;
        a boundary between the airbag body and the projecting portion;
        a bent portion located at the boundary, the projecting portion being bent from the bent portion relative to the airbag body when the airbag is unfolded and inflated, the bent portion defining a distal end of the airbag body, and the airbag body including a basal end located opposite the distal end, in which the base cloth farther from the occupant between the distal and basal ends of the air bag body is longer than the base cloth closer to the occupant between the distal and basal ends of the air bag body, the bent portion defining a basal end of the projecting portion, and the projecting portion including a distal end located opposite the basal end of the projecting portion, in which the base cloth farther from the occupant between the distal and basal ends of the projecting portion is shorter than the base cloth closer to the occupant between the distal and basal ends of the projecting portion; and
        a starting seam arranged in the bent portion, the starting seam being formed by sewing together the base cloths so that the base cloths have different lengths at the air bag body and the projecting portion.

2. The side airbag device according to claim 1, further comprising:
    a planar tether for connecting an inner side of the airbag body with an inner side of the projecting portion when the airbag is unfolded and inflated, with the inner sides of the airbag body and projecting portion facing into the passenger compartment.

3. The side airbag device according to claim 1, wherein the airbag includes:
    a pair of belt-shaped tethers, each including an outer edge and an inner edge, for connecting the base cloths to each other, with the distance between the outer edges of the belt-shaped tethers being greater than the distance between the inner edges of the belt-shaped tethers.

4. The side airbag device according to claim 1, further comprising:
    either one of a seam and a belt-shaped tether arranged on the airbag, the airbag being bent at a location where the either one of the seam and belt-shaped tether is arranged when the airbag is unfolded and inflated.

5. The side airbag device according to claim 1, further comprising:
    a joint seam arranged in the bent portion and formed by sewing the base cloth closer to the occupant at the distal end of the air bag body together with the base cloth closer to the occupant at the basal end of the projecting portion.

* * * * *